(12) United States Patent
Achan et al.

(10) Patent No.: US 11,238,495 B2
(45) Date of Patent: Feb. 1, 2022

(54) METHOD AND SYSTEM FOR DATA DRIVEN PERSONALIZATION

(71) Applicant: WAL-MART STORES, INC., Bentonville, AR (US)

(72) Inventors: Kannan Achan, Saratoga, CA (US); Venkata Syam Prakash Rapaka, San Bruno, CA (US); Jeremy King, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1046 days.

(21) Appl. No.: 14/860,221

(22) Filed: Sep. 21, 2015

(65) Prior Publication Data

US 2017/0083940 A1 Mar. 23, 2017

(51) Int. Cl.
*G06Q 30/02* (2012.01)
*G06Q 30/08* (2012.01)

(52) U.S. Cl.
CPC ..... *G06Q 30/0255* (2013.01); *G06Q 30/0277* (2013.01)

(58) Field of Classification Search
CPC ................ G06F 17/00; G06Q 30/0255; G06Q 30/0277; G06Q 30/00–0284
USPC .......................................................... 715/234
See application file for complete search history.

(56) References Cited

U.S. PATENT DOCUMENTS

| | | | | |
|---|---|---|---|---|
| 2012/0041816 A1* | 2/2012 | Buchalter | .............. | G06Q 30/02 705/14.41 |
| 2014/0068407 A1* | 3/2014 | Suh | .................. | G06F 17/30867 715/234 |

OTHER PUBLICATIONS

Jingxing Jiang, TPG-DNN: A Method for User Intent Prediction Based on Total Probability Formula and GRU Loss with Multi-task Learning, 2020, p. 3, (Year: 2020).*

* cited by examiner

*Primary Examiner* — Abhishek Vyas
*Assistant Examiner* — Darnell A Pouncil
(74) *Attorney, Agent, or Firm* — Bryan Cave Leighton Paisner LLP

(57) ABSTRACT

A system and method for providing a customized user experience is presented. A system can include one or more processing modules and one more non-transitory storage modules. The usage history of a user can be tracked at an eCommerce retailer. Static information about the user can also be tracked. Thereafter, using the usage history, the static information, and the available promotions of the retailer, a probability of conversion can be calculated for each promotion. Thereafter, the promotion being displayed to the user can be based on the probability of conversion. Other embodiments are also disclosed herein.

22 Claims, 5 Drawing Sheets

METHOD AND SYSTEM FOR DATA DRIVEN PERSONALIZATION

TECHNICAL FIELD

This disclosure relates generally to on-line retail sales and more particularly to a method and system for personalizing customer interaction with an online retailer's website.

BACKGROUND

An electronic commerce ("eCommerce") provider will typically maintain a website or a mobile app that allows customers to search and browse through the eCommerce provider's goods and services. It can be desirable for the eCommerce provider to showcase one or more goods or collections of goods in a personalized fashion that can be more likely to lead to sales and lead to a better experience for the customer.

BRIEF DESCRIPTION OF THE DRAWINGS

To facilitate further description of the embodiments, the following drawings are provided in which.

Figure 1:
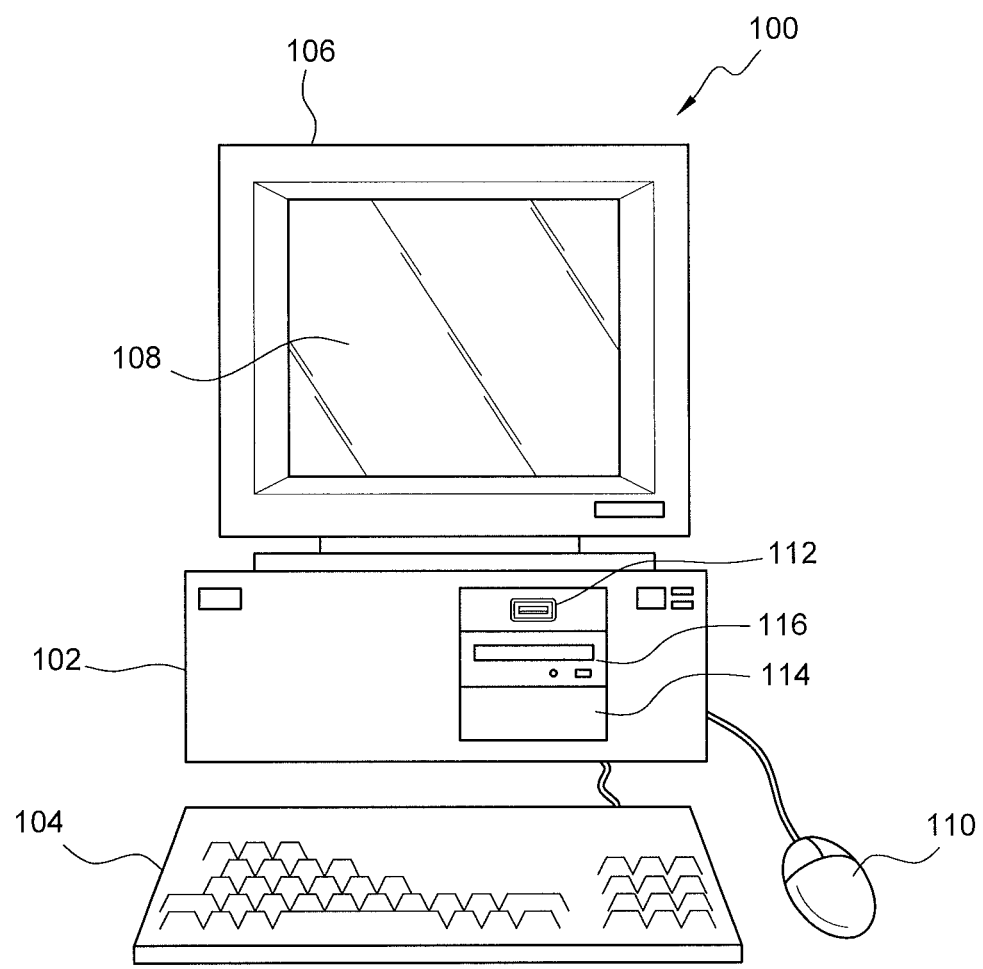
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a system might comprise: a display; one or more user input devices; one or more processing modules; and one or more non-transitory storage modules storing computing instructions configured to run on the one or more processing modules and perform the acts of: tracking usage history of a user at an eCommerce retailer; tracking static information about the user; for each promotion in a plurality of promotions, using the static information about the user and the usage history of the user to determine a probability of conversion for the user to be converted by the promotion; and causing a display to the user of at least one promotion from the plurality of promotions based on the probability of conversion for each promotion in the plurality of promotions.

In one embodiment, a method might comprise: tracking usage history of a user at an eCommerce retailer; tracking static information about the user; for each promotion in a plurality of promotions, using the static information about the user and the usage history of the user to determine a probability of conversion for the user to be converted by the promotion; and causing a display to the user of at least one promotion from the plurality of promotions based on the probability of conversion for each promotion in the plurality of promotions.

Figure 2:
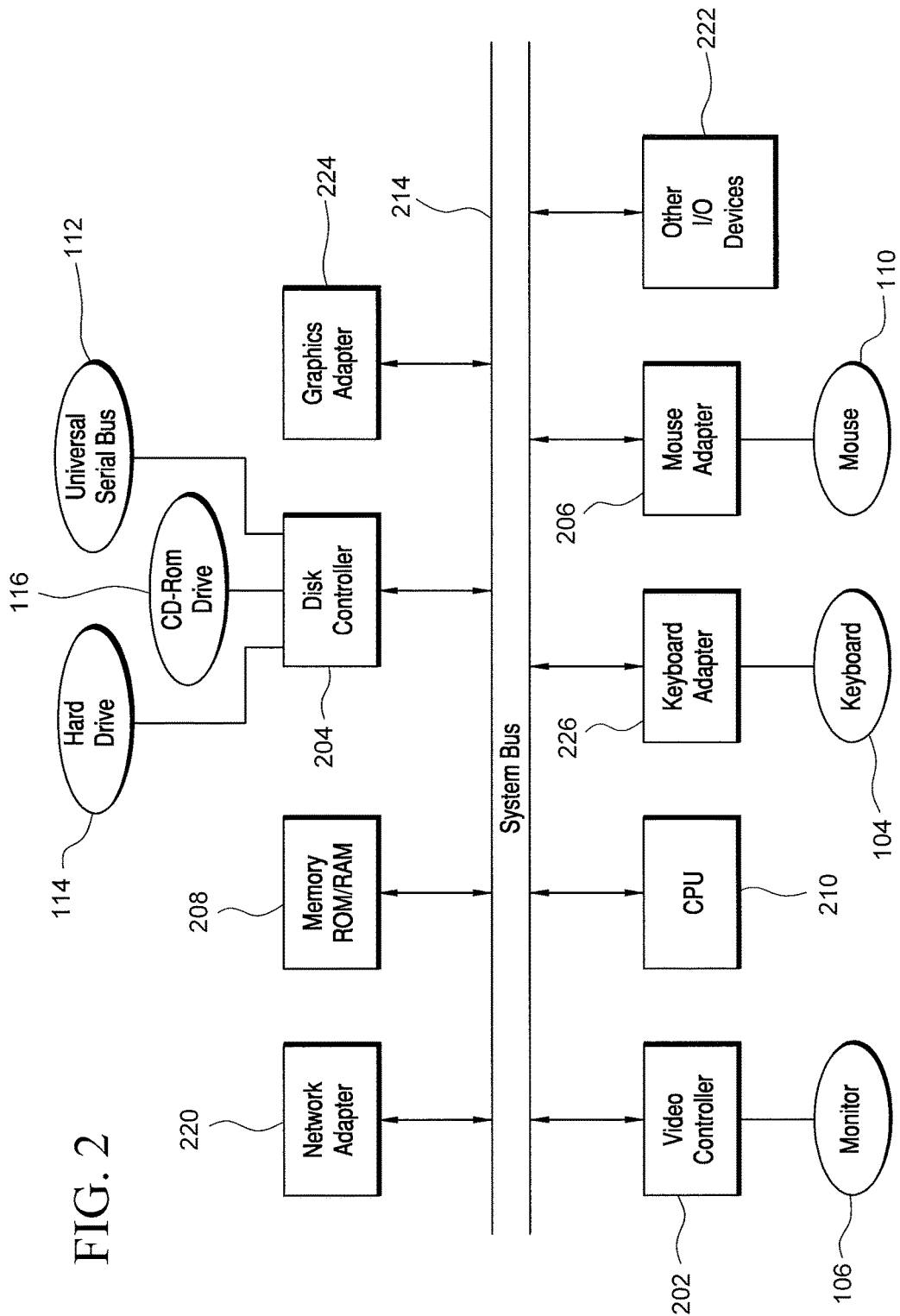
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
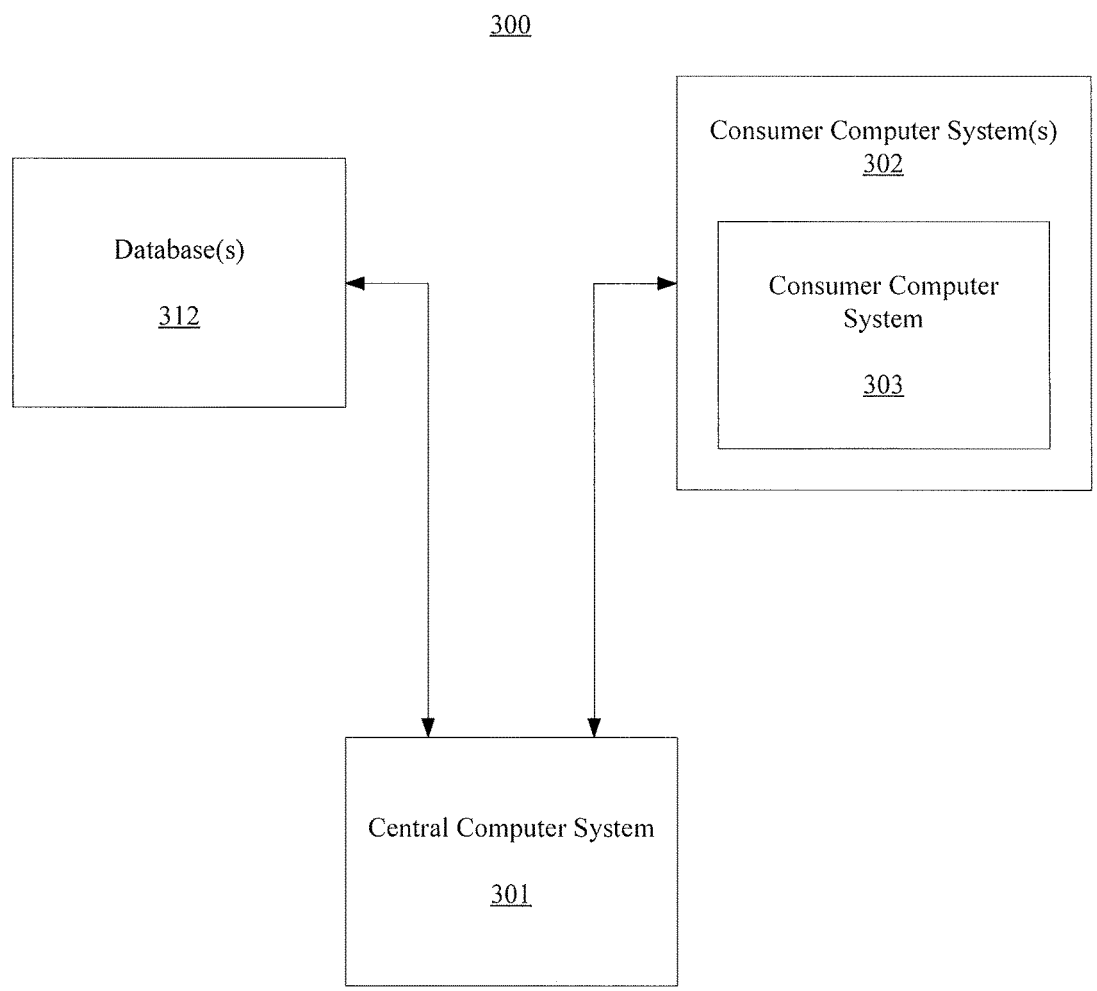
FIG. 3 is a representative block diagram of a system according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer; and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™ and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Electronic commerce (eCommerce) is a steadily growing portion of the retail sector. In 2014, eCommerce sales were over $300 billion in the United States. eCommerce sales have been growing with over ten percent (10%) growth rate each year for over a decade. As more and more products become available for sale to users over the Internet, the desire to manage the number of choices available to consumers becomes greater. In addition, as eCommerce sales continue to grow, there is a desire among eCommerce retailers to distinguish themselves from their competitors by providing a better experience for customers. Typically, a consumer accesses an eCommerce provider via a browser running on computer system such as consumer computer system 302 or via a mobile app running on a mobile device.

One method of satisfying both the desire to manage the number of choices available to consumers and to provide a better experience for the customers is to provide each user with an experience that is customized towards the customer's interests. For example, if a user is interested in fishing, show the user products that would be of interest to a fisherman. A user's interest can be further subdivided—for example, if a user is interested in video games, but only for the Xbox One and not the Playstation 4, it would be desirable to show the user Xbox games and accessories, but not Playstation 4 games and accessories. If a user has young children, show the user appropriate toys and clothing.

In traditional eCommerce sites, there can be a generic experience for users. Such a generic experience could involve showing currently active specials. For example, during the early summer, items related to summer vacations might be featured; during the late summer, items related to back-to-school sales might be featured; during the Thanksgiving season, Black Friday sales might be featured. While such a generic experience serves a useful purpose, namely, showing customers items and specials that are of interest to many people, there are downsides. For example, showing "back to school" sales to a person with no school-age children is not very helpful.

Other prior art eCommerce sites might utilize cookies or user accounts to track what a user has viewed in the past. A cookie is a small piece of data sent from a website and stored for use with a user's browser while the user is browsing that website. User accounts might utilize the fact that a user has "signed in" to a website before browsing to track items that the user has viewed.

However, such tracking is limited. In many cases, the tracking only serves to store only items that the user might have viewed in the past. For example, if a user clicks on a particular shoe while visiting an eCommerce website, that same shoe might be shown to the user the next time the user accesses the website. However, in many eCommerce websites, that is the extent of the tracking—displaying an item that the user has previously viewed so that the user might purchase the item the next time it is shown to the user.

In some embodiments, a concept called whole-page personalization (also known as whole session personalization) can be used to create a customized experience for customers. Various facts about each user can be tracked to create such an experience. Facts being tracked can include demographic information about the user, such as location, age, and gender. Facts being tracked also can include historical browsing and purchase behavior across multiple channels and multiple device types. Facts being tracked also can include in-store purchases from participating brick and mortar retailers.

The facts and data being tracked can be limited by time interval. For example, data within the previous 90 days can be given one level of emphasis (such as a lower level of emphasis); data within the previous 30 days can be given a different level of emphasis; and data within the previous 7 days can be given a third level of emphasis (such as a higher level of emphasis). The facts and data being tracked can include page views, items added to carts, online transactions, search terms, and categories/subcategories being viewed.

There are various promotions (also known as campaigns, sales, shelves, deals, and other similar terms) that can be shown to customers. A promotion can refer to a category or set of products being promoted together by an eCommerce retailer. An eCommerce retailer often has multiple promotions active at any time. Promotions might be time specific. For example, during the early summer, an exemplary eCommerce retailer might feature a promotion including a web page or series of web pages spotlighting summer clothing. Another promotion might feature pool accessories. During the winter, the same eCommerce retailer can have a promotion featuring winter clothing, a promotion featuring ski equipment, and a promotion featuring holiday items. Promotions can be region specific, such that promotions featuring boating accessories are displayed to users close to large bodies of water. Promotions featuring winter clothing might have a different selection being shown to users in Phoenix, Ariz. (which has a warmer winter climate) than to users in Boston, Mass. (which has a colder winter climate). A promotion can also be a collection of items specific to a user's interests. For example, a user who has been browsing guitars may be shown a collection of guitar accessories, while user who has been browsing tablet computers may be shown a collection of accessories for tablets.

Whole-page personalization can have various levels of specificity. There can be promotions being shown to a user based on the user's interests. There can be promotions being shown based on demographics of similar users. The whole-page personalization can be randomized, or assigned a probability of appearing to a user. In such a manner, the user is not presented with the same campaign(s) every time the user accesses a particular eCommerce website.

Figure 4:
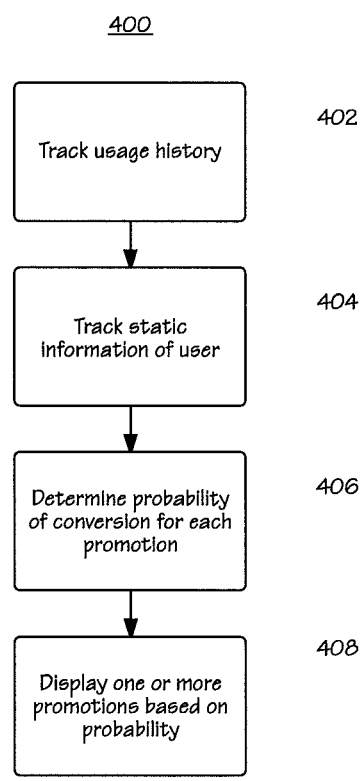
FIG. 4 is an exemplary method of advertising and selling products and services online using date driven personalization and according to an embodiment.

FIG. 4 shows a flowchart illustrating the operation of a method 400 of advertising & selling products and services online using data driven personalization. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, method 400 can be implemented by computer system 100 (FIG. 1). In some embodiments, method 400 can be implemented by central computer system 301 (FIG. 3).

When a user accesses a site of the eCommerce provider, the usage history of a user at an eCommerce provider is tracked (block 402). This can occur in a variety of different manners. For example, tracking cookies can be used to monitor the user's views and purchases. In some embodiments, a user can submit account credentials via a browser or mobile app interface prior to accessing the eCommerce provider's site. A combination of various methods also can be used. An advantage of utilizing a user account is the ability to track the user through multiple devices (e.g., a laptop computer, a phone and a tablet). The information being tracked can include previous purchases made by the user, pages viewed by the user, product categories viewed by the user, additions to cart, removals from a cart, the placement of an item on a registry, the placement of an item on a wish list, and search terms entered by the user. In some embodiments, a user can link an eCommerce account to an account at a participating brick and mortar store (e.g., through the use of a bar code scanned in at a brick and mortar store). Thereafter, the user's purchases at the brick and mortar store can be linked to her account at the eCommerce provider.

Static information about the user is tracked (block 404). This static information includes demographic information, such as sex, age, and geographical location. If the user is being tracked via a user account, the user typically supplies the demographic information when creating the account. In some embodiments, location information can be tracked via global positioning satellite (GPS) signals if the user is using a device with GPS capabilities. In some embodiments, location information can be tracked via the internet protocol (IP) address of the device being used by the user. In some embodiments, location information can be part of the demographic information supplied by the user in the user account.

An eCommerce provider typically has multiple promotions that are active at any one time. As described above, some promotions are time specific (e.g., based around a holiday or a time of the year). Other promotions might be more generic in that they can be used at any time of the year to highlight certain types of goods (e.g., a promotion featuring cameras or pet supplies).

For each active promotion, there can be historical training data that can be used for comparison purposes. Such historical training can aggregate static information and usage history about a large number of users. Thereafter, when a user accesses the website, the static information and usage information about the user can be compared to the historical training data to estimate how similar users would behave.

For each promotion of the plurality of promotions, a probability of the user being converted by the promotion is calculated (block 406). In some embodiments, conversion can mean the probability of the user buying a product when being shown a promotion. In some embodiments, conversion can mean the probability of the user accessing a page when being shown a promotion.

The probability of the user being converted by the promotion can be calculated in a variety of different manners. In some embodiments, a maximum entropy model can be used to predict which promotions should be shown to a user. The following is equation containing a formulation of an exemplary maximum entropy model:

$$p(c \mid x, w) = \frac{1}{1 + \exp(-w^T x)}$$

Where w denotes the weight vector, c denotes conversion, and x is a particular feature. The above expression finds the probability of a conversion given a certain feature. The term "conversion" can have a variety of meanings in various embodiments. In some embodiments, a conversion occurs when a user purchases an item. Thus, the above equation determines the probability that a user will purchase an item based on the promotion being shown to the user.

A "feature" can represent a variety of different information being tracked. Static features (also known as static information) can include a customer's age, gender, location. Dynamic features can include usage history, such as page views within the past 90 days, 30 days, 7 days; items purchased; items added to a cart; categories viewed; and search terms that were entered. Features also can include information about the campaign.

Features can be tracked for many different users over different periods of time. As described above, intervals being used can be any length. In some embodiments, interval lengths being used include 90 days, 30 days, 7 days, and 1 day. Thereafter, with respect to a particular user, conversion predictions can be made based on similarity of the user to the training data. The conversion predictions can be made using maximum likelihood estimations to estimate the maximum entropy model. The optimal parameter configuration can be determined by maximizing the conditional log probability of observing the training data. An exemplary equation is as follows:

$$\mathrm{argmax}_w \sum_t \log p(c_t \mid x_t, w) = \mathrm{argmax}_w \sum_t \frac{1}{1 + \exp(-w^t x)}$$

In other words, the above formula finds which promotion gives the highest conversion rate for a particular user. Conversion rate can be determined using a variety of training data. In some embodiments, training data is used to serve as a baseline conversion rate. Training data is collected for a variety of different users with various different demographic features. Training data can be created by aggregating the usage history of a group of users. In some embodiments, the group of users comprise the user. From this training data, it can be determined which promotions are popular with a variety of demographic features. Thereafter, a user can be compared to users with a similar demographic profile to determine the conversion probability. A wide variety of demographic information can be used in the calculation of the conversion probability. Exemplary demographic information can include a user's location, age, gender, and any registries that the user has created.

Promotions are then displayed to the user based on the probability of conversion (block 408). In some embodiments, the promotions being shown correspond to the promotions with the highest probability of conversion. In some embodiments, the probability of conversion can be used to assign weights to each promotion. Thereafter, the promotions being shown to the user can be shown randomly to the user, with the randomness weighted by the assigned weights. The purpose of having a random component in the displayed promotion is to provide a user with a different user experience each time the user visited the eCommerce provider's site. Displaying a different promotion to a user might result in greater conversion than showing the same promotion to the user every time the user accesses the eCommerce provider's site.

For example, there might be a situation where there are three active promotions. Due to the calculated probability of conversion, there is an estimated 60% chance of the user being converted by the first promotion, an estimated 30% chance of the user being converted by the second promotion, and an estimated 10% chance of the user being converted by the third promotion. The weights assigned to the promotions are then 6, 3, and 1, respectively. Therefore, although the promotion being shown to the user is random, the promotion most likely to result in a conversion is 6 times more likely to appear than the promotion least likely to result in a conversion. It should be understood that this example can be extended to many more promotions. Also, an eCommerce provider might have many more than three active promotions. In addition, an eCommerce provider might have a website or mobile app that displays more than one active promotion to the user at the same time. In such a case, a weighted random algorithm can be used to display 2 or 3 or more promotions to the user.

It should be understood that being displayed to the user can comprise transmitting text, images, and formatting codes (such as hypertext markup language ("HTML")) to a user's device that result in the display of one or more promotions to a user via a browser or mobile app.

Figure 5:
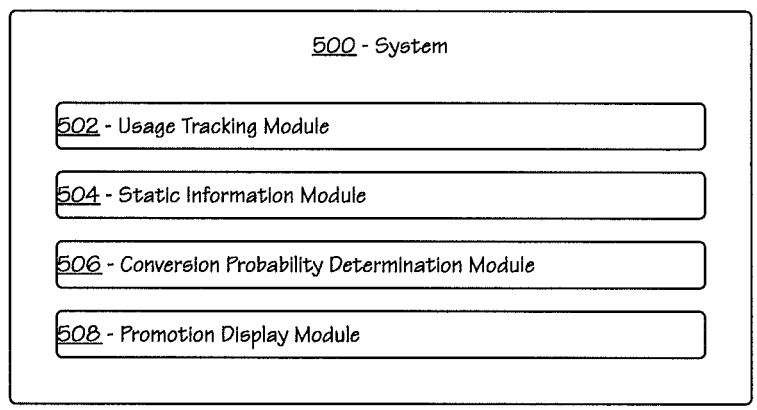
FIG. 5 is an exemplary block diagram of a system capsule of performing embodiments described herein according to an embodiment.

Turning ahead in the figures, FIG. 5 illustrates a block diagram of a system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

In a number of embodiments, system 500 can include usage tracking module 502. In certain embodiments, playback instruction usage tracking module 502 can perform block 402 (FIG. 4) of tracking the usage history of a user.

In a number of embodiments, system 500 can include static information module 504. In certain embodiments, static information module 504 can perform block 404 (FIG. 4) of tracking static information about the user.

In a number of embodiments, system 500 can include conversion probability determination module 506. In certain embodiments, conversion probability determination module 506 can perform block 406 (FIG. 4) of determining the conversion probability of each promotion.

In a number of embodiments, system 500 can include promotion display module 508. In certain embodiments, promotion display 508 can perform block 408 (FIG. 4) of causing the display of one or more promotions.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more user input devices;
one or more processors; and
one or more non-transitory storage devices storing computing instructions configured to run on the one or more processors and perform:
  tracking, using the one or more processors, usage history of a user comprising:
    interactions of the user with an eCommerce retailer, the interactions collected across multiple electronic devices of the user; and
    views and purchases of the user collected at a website of the eCommerce retailer stored in one or more electronic cookies;
  storing the usage history of the user at the one or more non-transitory storage devices;
  tracking, using the one or more processors, static information about the user;
  storing the static information about the user at the one or more non-transitory storage devices;
  aggregating the usage history of the user and the static information about the user with other usage history of a plurality of other users and other static information about the plurality of other users;
  creating training data from the usage history of the user, the static information about the user, the other usage history of the plurality of other users and the other static information about the plurality of other users, as aggregated;
  accessing the one or more non-transitory storage devices to retrieve the training data;
  training a machine learning algorithm on the training data;

for each respective promotion in a plurality of promotions:
    using the machine learning algorithm, as trained, to determine a respective probability of conversion for the user to be converted by the respective promotion of the plurality of promotions; and
    assigning a respective weight to the respective promotion of the plurality of promotions based on the respective probability of conversion for the user to be converted by the respective promotion of the plurality of promotions;
causing to be displayed, on an electronic device of the user and using one or more markup languages, at least one respective promotion from the plurality of promotions based on its respective weight, as assigned, for the at least one respective promotion, wherein:
    the at least one respective promotion from the plurality of promotions are randomly selected from the plurality of promotions; and
    a number of times a respective one of the at least one respective promotion from the plurality of promotions is caused to be displayed on the electronic device of the user is directly proportional to its weight, as assigned, as compared with weights, as assigned, of other respective promotions of the at least one respective promotion;
after a predetermined time period has elapsed, updating the usage history of the user;
re-training the machine learning algorithm, as trained, on the usage history of the user, as updated;
for each respective promotion in the plurality of promotions:
    using the machine learning algorithm, as trained and re-trained, to determine a new respective probability of conversion for the user to be converted by the respective promotion of the plurality of promotions; and
    assigning a new respective weight to the respective promotion of the plurality of promotions based on the new respective probability of conversion for the user to be converted by the respective promotion of the plurality of promotions; and
causing to be displayed, on the electronic device of the user, the at least one respective promotion from the plurality of promotions based on the new respective weight, as assigned, of the at least one respective promotion.

2. The system of claim 1 wherein:
the machine learning algorithm, as trained, comprises a maximum entropy model.

3. The system of claim 2 wherein:
the maximum entropy model comprises an equation comprising:

$$p(c \mid x, w) = \frac{1}{1 + \exp(-w^T x)},$$

wherein:
w denotes a weight vector;
c denotes a conversion probability;
x denotes a particular feature; and
T denotes a time period.

4. The system of claim 1 wherein:
the static information about the user includes demographic information about the user.

5. The system of claim 1 wherein
the usage history of the user comprises:
    previous purchases made by the user on the website of the eCommerce retailer;
    pages of the website of the eCommerce retailer viewed by the user;
    product categories viewed by the user on the website of the eCommerce retailer; or
    a search history of the user on the website of the eCommerce retailer.

6. The system of claim 5 wherein:
using the machine learning algorithm comprises:
    using the machine learning algorithm to determine a respective maximized conditional log probability for each respective promotion of the plurality of promotions; and
the computing instructions are further configured to run on the one or more processors and perform:
    determining a promotion of the plurality of promotions with a highest probability of conversion by finding a promotion of the plurality of promotions with a highest respective maximized conditional log probability.

7. The system of claim 6 wherein:
using the machine learning algorithm to determine the respective maximized conditional log probability comprises using an equation comprising:

$$\operatorname*{argmax}_{w} \sum_{t} \log p(c_t \mid x_t, w) = \operatorname*{argmax}_{w} \sum_{t} \frac{1}{1 + \exp(-w^t x)},$$

wherein:
w denotes a weight vector;
c denotes a conversion probability;
x denotes a particular feature;
t denotes a time period; and
p denotes an output from a maximum entropy model.

8. The system of claim 1 wherein
causing to be displayed, on the electronic device of the user comprises:
    causing to be displayed, on the electronic device of the user, a promotion of the plurality of promotions with a highest probability of conversion.

9. A method comprising:
tracking, using a processor, usage history of a user comprising:
    interactions of the user with an eCommerce retailer, the interactions collected across multiple electronic devices of the user; and
    views and purchases of the user collected at a website of the eCommerce retailer stored in one or more electronic cookies;
storing the usage history of the user at one or more non-transitory storage devices;
tracking, using the processor, static information about the user;
storing the static information about the user at the one or more non-transitory storage devices;
aggregating the usage history of the user and the static information about the user with other usage history of a plurality of other users and other static information about the plurality of other users;

creating training data from the usage history of the user, the static information about the user, the other usage history of the plurality of other users and the other static information about the plurality of other users, as aggregated;
accessing the one or more non-transitory storage devices to retrieve the training data;
training a machine learning algorithm on the training data;
for each respective promotion in a plurality of promotions:
  using the machine learning algorithm, as trained, to determine a respective probability of conversion for the user to be converted by the respective promotion of the plurality of promotions; and
  assigning a respective weight to the respective promotion of the plurality of promotions based on the respective probability of conversion for the user to be converted by the respective promotion of the plurality of promotions;
causing to be displayed, on an electronic device of the user and using one or more markup languages, at least one respective promotion from the plurality of promotions based on its respective weight, as assigned, for the at least one respective promotion, wherein:
  the at least one respective promotion from the plurality of promotions are randomly selected from the plurality of promotions; and
  a number of times a respective one of the at least one respective promotion from the plurality of promotions is caused to be displayed on the electronic device of the user is directly proportional to its weight, as assigned, as compared with weights, as assigned, of other respective promotions of the at least one respective promotion;
after a predetermined time period has elapsed, updating the usage history of the user; re-training the machine learning algorithm, as trained, on the usage history of the user, as updated;
for each respective promotion in the plurality of promotions:
  using the machine learning algorithm, as trained and re-trained, to determine a new respective probability of conversion for the user to be converted by the respective promotion of the plurality of promotions; and
  assigning a new respective weight to the respective promotion of the plurality of promotions based on the new respective probability of conversion for the user to be converted by the respective promotion of the plurality of promotions; and
causing to be displayed, on the electronic device of the user, the at least one respective promotion from the plurality of promotions based on the new respective weight, as assigned, of the at least one respective promotion.

10. The method of claim 9 wherein:
the machine learning algorithm, as trained, comprises a maximum entropy model.

11. The method of claim 10 wherein:
the maximum entropy model comprises an equation comprising:

$$p(c \mid x, w) = \frac{1}{1 + \exp(-w^T x)},$$

wherein:
w denotes a weight vector;
c denotes a conversion probability;
x denotes a particular feature; and
T denotes a time period.

12. The method of claim 9 wherein:
the static information about the user includes demographic information about the user.

13. The method of claim 9 wherein
the usage history of the user comprises:
  previous purchases made by the user on the website of the eCommerce retailer;
  pages of the website of the eCommerce retailer viewed by the user;
  product categories viewed by the user on the website of the eCommerce retailer; or
  a search history of the user on the website of the eCommerce retailer.

14. The method of claim 13, wherein:
using the machine learning algorithm comprises:
  using the machine learning algorithm to determine a respective maximized conditional log probability for each respective promotion of the plurality of promotions; and
the method further comprises:
  determining a promotion of the plurality of promotions with a highest probability of conversion by finding a promotion of the plurality of promotions with a highest respective maximized conditional log probability.

15. The method of claim 14 wherein:
using the machine learning algorithm to determine the respective maximized conditional log probability comprises using an equation comprising:

$$\operatorname*{argmax}_{w} \sum_t \log p(c_t \mid x_t, w) = \operatorname*{argmax}_{w} \sum_t \frac{1}{1 + \exp(-w^t x)},$$

wherein:
w denotes a weight vector;
c denotes a conversion probability;
x denotes a particular feature;
t denotes a time period; and
p denotes an output from a maximum entropy model.

16. The method of claim 9 wherein causing to be displayed, on the electronic device of the user comprises:
causing to be displayed, on the electronic device of the user, a promotion with a highest probability of conversion.

17. The system of claim 1 wherein:
the at least one respective promotion comprises at least two respective promotions of the plurality of promotions, each respective promotion of the at least two respective promotions being different from each other;
causing to be displayed, on the electronic device of the user, comprises:
  causing to be displayed, on the electronic device of the user, the at least two respective promotions of the plurality of promotions during at least two browsing sessions of the user based on respective weights of each respective promotion of the at least two respective promotions, as assigned; and
the at least two respective promotions are never simultaneously displayed on the electronic device of the user.

18. The method of claim 9 wherein:
the at least one respective promotion comprises at least two respective promotions of the plurality of promotions, each respective promotion of the at least two respective promotions being different from each other;
causing to be displayed, on the electronic device of the user, comprises:
causing to be displayed, on the electronic device of the user, the at least two respective promotions of the plurality of promotions during at least two browsing sessions of the user based on respective weights of each respective promotion of the at least two respective promotions, as assigned; and
the at least two respective promotions are never simultaneously displayed on the electronic device of the user.

19. The system of claim 1, wherein the static information about the user comprises location data collected from a GPS module of the electronic device of the user.

20. The method of claim 9, wherein the static information about the user comprises location data collected from a GPS module of the electronic device of the user.

21. The system of claim 1, wherein updating the usage history of the user comprises:
updating one or more dynamic features in the training data.

22. The method of claim 9, wherein updating the usage history of the user comprises:
updating one or more dynamic features in the training data.

* * * * *